UNITED STATES PATENT OFFICE.

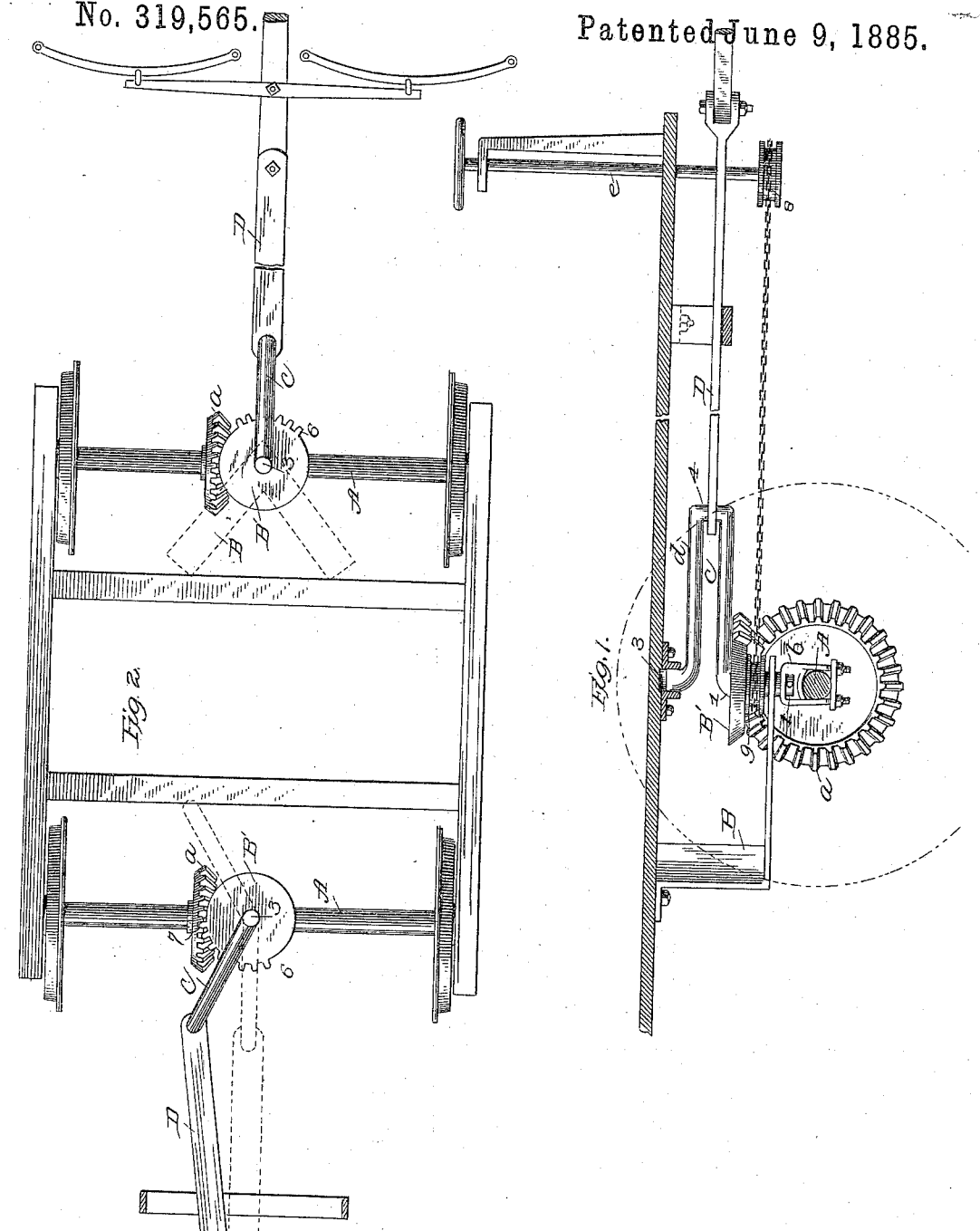

DAVID W. COPELAND, OF SYRACUSE, NEW YORK.

CAR-STARTER.

SPECIFICATION forming part of Letters Patent No. 319,565, dated June 9, 1885.

Application filed October 10, 1884. (No model.)

*To all whom it may concern:*

Be it known that I, DAVID W. COPELAND, of Syracuse, in the county of Onondaga and State of New York, have invented a new and useful Improvement in Car-Starters; and I do hereby declare that the following is a full, clear, and exact description of the same.

My invention relates to street-cars; and my object is to cause the initial strain of the motive power to be thrown upon the axle to turn the wheels, instead of being exerted directly upon the car.

My invention consists of a special construction of combined crank and bevel-gears, as hereinafter set forth.

In the accompanying drawings, Figure 1 shows a side elevation, fully in section, of part of a car with my improved starter attached. Fig. 2 is a plan view of the car and starter.

In these figures, A represents the axle of a street-car, on which is set a vertical bevel-gear, a.

Supported by a bracket, B, and connections b on the axle is a second bevel-gear, B', mutilated, as shown in Fig. 2. This gear is fixed on the wrist 1 of a crank, C, the wrist turning in its bearing in the bracket and axle connection. The other wrist, 2, on line with the first named, has its bearing 3 on the car-bottom in vertical line with the other bearing. The crank is a loop or double crank, d, and to the connecting-rod 4 is attached, by suitable eye, the draft-bar D. The loop allows the mutilated gear to make complete revolutions. The crank is set so that when the leading end 6 of the row of teeth of the mutilated gear is coming into contact with the other bevel-gear the crank is thrown back and to one side, as represented at 7, Fig. 2. Obviously by forward draft the crank is drawn forward, and the teeth meshing cause the axle to turn and give an initial impulse to the car much greater than the direct draft. When the crank is drawn directly forward, as shown in the right hand of Fig. 2, the draft comes upon the car-body in the ordinary way. When the car is stopped, the gear B may be turned farther in the same direction until the teeth come around to the position first described, when they are ready for another start. This continued movement of the mutilated gear for moving back the crank may be caused by any suitable device in reach of the driver.

In Fig. 1 I have shown a complete and convenient form.

Just underneath the gear B is a pulley, g, (or a sprocket-wheel,) and this is connected by a chain or band to a pulley or sprocket-wheel, 8, on a shaft, e, the handle or wheel of which is in reach of the driver. By turning the handle or wheel the gear B is revolved and the crank turned back to position shown at 7, Fig. 2. The shaft e may be the brake-shaft, and the parts may be so adjusted that the gear B and crank are properly turned by the movement which applies the brake.

The construction shown in the drawings is designed for horse-cars; but the device may, without material change, be applied to cars drawn by traction-cables.

I claim as my invention—

1. In combination with the axle A, a vertical bevel-gear fixed thereon, a horizontal mutilated bevel-gear mounted on a crank, a draft-bar attached to the crank, and means for returning the crank to the rear, all substantially as described.

2. In combination with the axle A, the bevel-gear a, mutilated gear B, crank C, having bearings and pulley on lower wrist, the bar attached to the crank, the shaft e, and the chain connecting the pulleys, all substantially as described.

In testimony whereof I have signed my name to this specification in the presence of two subscribing witnesses.

D. W. COPELAND.

Witnesses:
  F. L. MIDDLETON,
  WALTER DONALDSON.